(12) United States Patent
Benson et al.

(10) Patent No.: US 7,553,175 B1
(45) Date of Patent: Jun. 30, 2009

(54) POWER DISTRIBUTION SYSTEM AND ELECTRICAL CONNECTOR ASSEMBLY THEREFOR

(75) Inventors: Tony R. Benson, White Heath, IL (US); Eric A. Samuelson, Springfield, IL (US); Edward E. Lias, Aliquippa, PA (US); Sandy O. Jimenez, Monaca, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 12/172,576

(22) Filed: Jul. 14, 2008

(51) Int. Cl.
*H02B 1/04* (2006.01)
(52) U.S. Cl. .................. 439/212; 439/830; 361/637
(58) Field of Classification Search ............... 439/212, 439/830, 213; 361/637, 627, 823, 624, 648, 361/622, 631
See application file for complete search history.

(56) References Cited

U.S. PATENT DOCUMENTS

| | | | | |
|---|---|---|---|---|
| 4,180,846 A | * | 12/1979 | Wilson et al. | 361/643 |
| 5,272,591 A | * | 12/1993 | Blue et al. | 361/622 |
| 5,493,085 A | | 2/1996 | Kolberg et al. | |
| 5,510,960 A | * | 4/1996 | Rosen | 361/823 |
| 5,640,294 A | * | 6/1997 | Caggiano et al. | 361/637 |
| 6,102,750 A | | 8/2000 | Little et al. | |
| 6,786,749 B2 | | 9/2004 | Meiners et al. | |

* cited by examiner

*Primary Examiner*—Gary F. Paumen
(74) *Attorney, Agent, or Firm*—Martin J. Moran

(57) ABSTRACT

An electrical connector assembly is provided for electrically connecting an electrical apparatus, such as a circuit breaker, to an electrical bus member. The electrical connector assembly includes a contact stab extending outwardly from the electrical bus member. The contact stab includes first and second sides having first and second indentations, respectively, which are disposed opposite one another. A clip member mechanically couples and electrically connects the circuit breaker to the contact stab. The clip member includes a first leg and a second leg disposed opposite and distal from the first leg. The first leg engages the first indentation of the first side of the contact stab and the second leg engages the second indentation of the second side of the contact stab, thereby retaining the clip member on the contact stab.

20 Claims, 3 Drawing Sheets ial connector assembly may be structured to electrically connect the at least one electrical switching apparatus to a corresponding one of the number of contact stabs of the electrical bus member.

POWER DISTRIBUTION SYSTEM AND ELECTRICAL CONNECTOR ASSEMBLY THEREFOR

BACKGROUND OF THE INVENTION

1. Field of the Invention

The invention relates generally to power distribution systems and, more particularly, to power distribution systems, such as electrical enclosures including electrical connector assemblies. The invention also relates to electrical connector assemblies for power distributions systems.

2. Background Information

Electrical apparatus, such as electrical switching apparatus or electrical meters used in power distribution systems, are often mounted on or within an electrical enclosure (e.g., without limitation, a panelboard; a load center; a meter breaker panel) either individually or in combination with other electrical meters or switchgear (e.g., without limitation, circuit switching devices and circuit interrupters such as circuit breakers, contactors, motor starters, motor controllers and other load controllers).

The electrical enclosure is typically coupled to and supported by a structure such as, for example, a wall of a building, and includes a number of electrical bus members. Electrical connector assemblies mechanically couple and electrically connect the electrical apparatus to corresponding electrical bus members. Known electrical connector assemblies typically include a clip member or a number of separate fasteners that are structured to mechanically couple the electrical apparatus to a contact stab of the desired electrical bus member. However, the use of separate fasteners is disadvantageous because it is time-consuming and requires separate tools. Moreover, space constraints within the interior of the electrical enclosure inhibit access to the fasteners, making it difficult to achieve proper mechanical and/or electrical connection between the electrical apparatus and its corresponding electrical bus member.

While known clip members overcome some of the foregoing disadvantages concerning separate fasteners, they too suffer from their own unique set of difficulties. In particular, the retention force of the clip member for retaining the clip member on the contact stab and, therefore, maintaining the desired mechanical and electrical connections between the electrical bus member and the electrical apparatus, is less than desired. That is, relatively little force is required to overcome the retention force of the clip member and disconnect the electrical connector assembly. This can lead to an unintentional disconnection and/or can inhibit electrical performance of the power distribution system.

There is, therefore, room for improvement in power distributions systems and in electrical connector assemblies therefor.

SUMMARY OF THE INVENTION

These needs and others are met by embodiments of the invention, which are directed to an electrical connector assembly employing a contact stab that is structured to increase the retention force between electrical apparatus and electrical bus members of power distribution systems.

As one aspect of the invention, an electrical connector assembly is provided for electrically connecting an electrical apparatus to an electrical bus member. The electrical connector assembly comprises: a contact stab structured to extend outwardly from the electrical bus member, the contact stab comprising a first side including a first indentation and a second side including a second indentation, the second indentation being disposed opposite the first indentation; and a clip member structured to mechanically couple and electrically connect the electrical apparatus to the contact stab, the clip member including a first leg and a second leg disposed opposite and distal from the first leg. The first leg of the clip member engages the first indentation of the first side of the contact stab and the second leg of the clip member engages the second indentation of the second side of the contact stab, thereby retaining the clip member on the contact stab.

The first leg of the clip member may have a first curved contact surface, and the second leg of the clip member may have a second curved contact surface wherein, when the clip member is mechanically coupled and electrically connected to the contact stab, the first curved contact surface is disposed in the first indentation of the contact stab and the second curved contact surface is disposed in the second indentation of the contact stab. When the clip member is not mechanically coupled and electrically connected to the contact stab, the first curved contact surface of the clip member may be spaced apart from the second curved contact surface of the clip member a first distance. The first side of the contact stab may be spaced apart from the second side of the contact stab a second distance. The first distance may be less than the second distance in order that, when the clip member is mechanically coupled and electrically connected to the contact stab, the first leg of the clip member is biased against the first side of the contact stab and the second leg of the clip member is biased against the second side of the contact stab.

Each of the first indentation of the contact stab and the second indentation of the contact stab may have a first radius of curvature, each of the first curved contact surface of the first leg of the clip member and the second curved contact surface of the second leg of the clip member may have a second radius of curvature. The first radius of curvature may be substantially the same as the second radius of curvature. Each of the first indentation of the contact stab and the second indentation of the contact stab may have a depth. The depth may be at least 0.002 inch. The contact stab may further comprise a first edge and a second edge disposed opposite and distal from the first edge, and each of first indentation of the contact stab and the second indentation of the contact stab may have a center point. The center point may be located a predetermined distance from the first edge. The predetermined distance may be about 0.139 inch to about 0.149 inch.

As another aspect of the invention, a power distribution system comprises: an electrical bus member including a number of contact stabs each comprising a first side including a first indentation and a second side including a second indentation, the second indentation being disposed opposite the first indentation; at least one electrical apparatus; and at least one electrical connector assembly comprising: a clip member mechanically coupling and electrically connecting a corresponding one of the at least one electrical apparatus to a corresponding one of the number of contact stabs of the electrical bus member, the clip member including a first leg and a second leg disposed opposite and distal from the first leg. The first leg of the clip member engages the first indentation of the first side of the corresponding one of the number of contact stabs and the second leg of the clip member engages the second indentation of the second side of the corresponding one of the number of contact stabs, thereby retaining the clip member on the corresponding one of the number of contact stabs.

The power distribution system may be a load center, and the at least one electrical apparatus may be at least one electrical switching apparatus. The at least one electrical connector assembly may mechanically couple and electrically connect such electrical switching apparatus to the corresponding contact stab of the electrical bus member.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
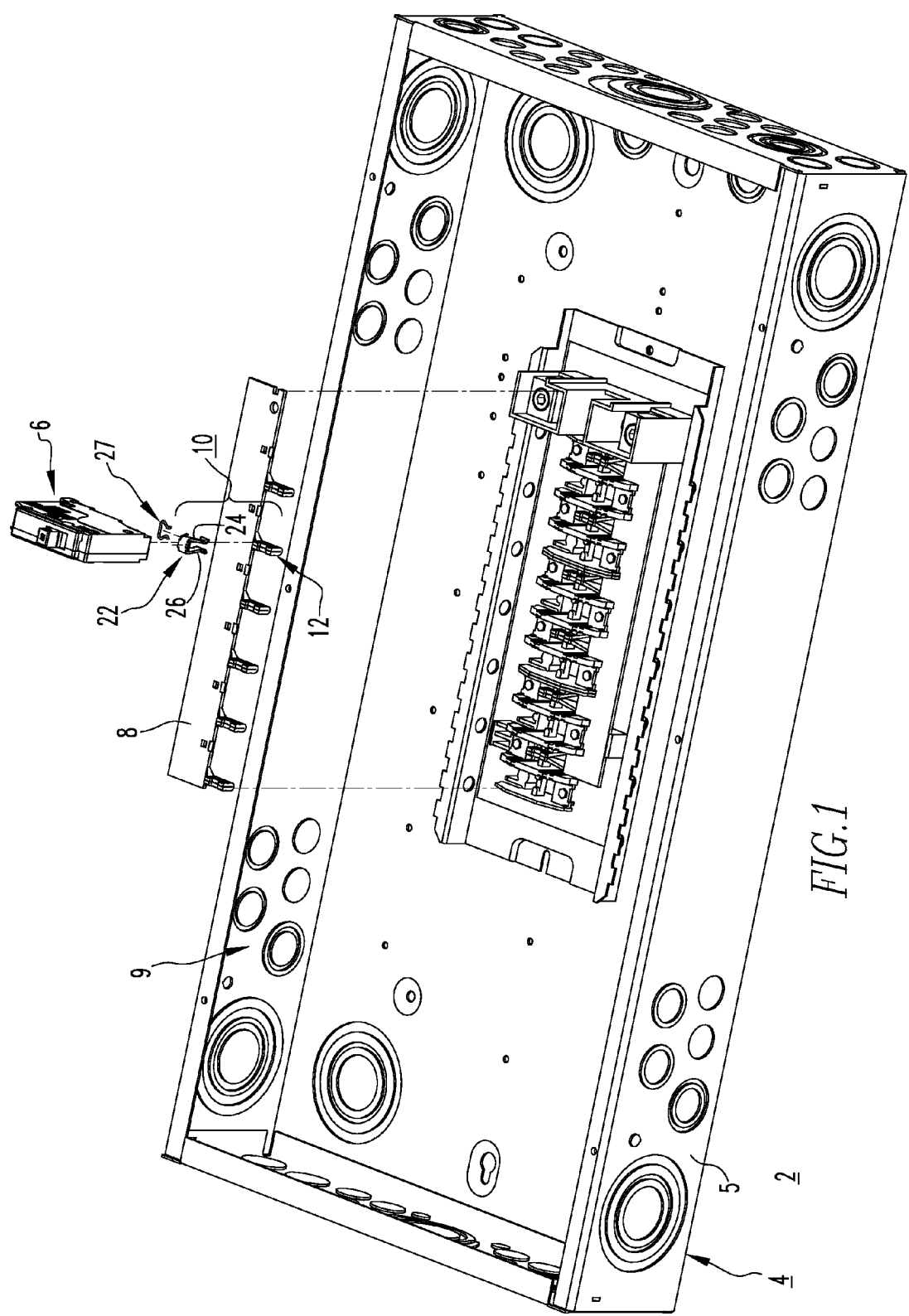
FIG. 1 is a partially exploded isometric view of a power distribution system and electrical connector assembly therefor, in accordance with an embodiment of the invention, with the cover of the electrical enclosure being removed to show internal structures.

For purposes of illustration, embodiments of the invention will be described as applied to electrical connector assemblies for retaining circuit breakers in a load center, although it will become apparent that they could also be applied to retain any known or suitable electrical apparatus (e.g., without limitation, electrical meters; circuit switching devices; circuit interrupters other than circuit breakers, such as contactors, motor starters, motor controllers and other load controllers) in power distribution systems other than load centers such as, for example and without limitation, panelboards and meter breaker panels.

Directional phrases used herein, such as, for example, right, left, upward, downward, inward, outward and derivatives thereof, relate to the orientation of the elements shown in the drawings and are not limiting upon the claims unless expressly recited therein.

As employed herein, the term "electrical bus" or "electrical bus member" refers to any known or suitable electrical conductor which carries or transfers voltage, current or power.

As employed herein, the term "contact stab" refers to a portion of the electrical bus member to which a clip member of a corresponding electrical apparatus (e.g., without limitation, an electrical switching apparatus; an electrical meter) is electrically connected.

As employed herein, the term "electrical connector assembly" refers to an apparatus providing an electrical connection (e.g., without limitation, terminal connection) between a contact stab and a corresponding electrical apparatus.

As employed herein, the term "fastener" refers to any suitable connecting or tightening mechanism expressly including, but not limited to, rivets, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIG. 1 shows an electrical connector assembly 10 for electrically connecting an electrical apparatus such as, for example and without limitation, a circuit breaker 6, to an electrical bus member 8 in a power distribution system 2. In the example of FIG. 1, the power distribution system 2 includes a load center 4 having an electrical enclosure 5. The aforementioned electrical bus member 8 is mounted within the interior 9 of the electrical enclosure 5, and the circuit breaker 6 is mechanically coupled and electrically connected thereto by way of the electrical connector assembly 10, as described in greater detail hereinbelow. For simplicity of illustration and economy of disclosure, only one electrical apparatus (e.g., without limitation, circuit breaker 6) and corresponding electrical connector assembly 10 therefor is shown. It will, however, be appreciated that any known or suitable number and/or configuration of circuit breakers (e.g., 6) or other suitable electrical apparatus (e.g., without limitation, electrical meters; circuit switching devices; circuit interrupters other than circuit breakers, such as contactors, motor starters, motor controllers and other load controllers) (not shown) could be suitably mechanically coupled and electrically connected using the disclosed electrical connector assembly (e.g., 10).

Figure 2:
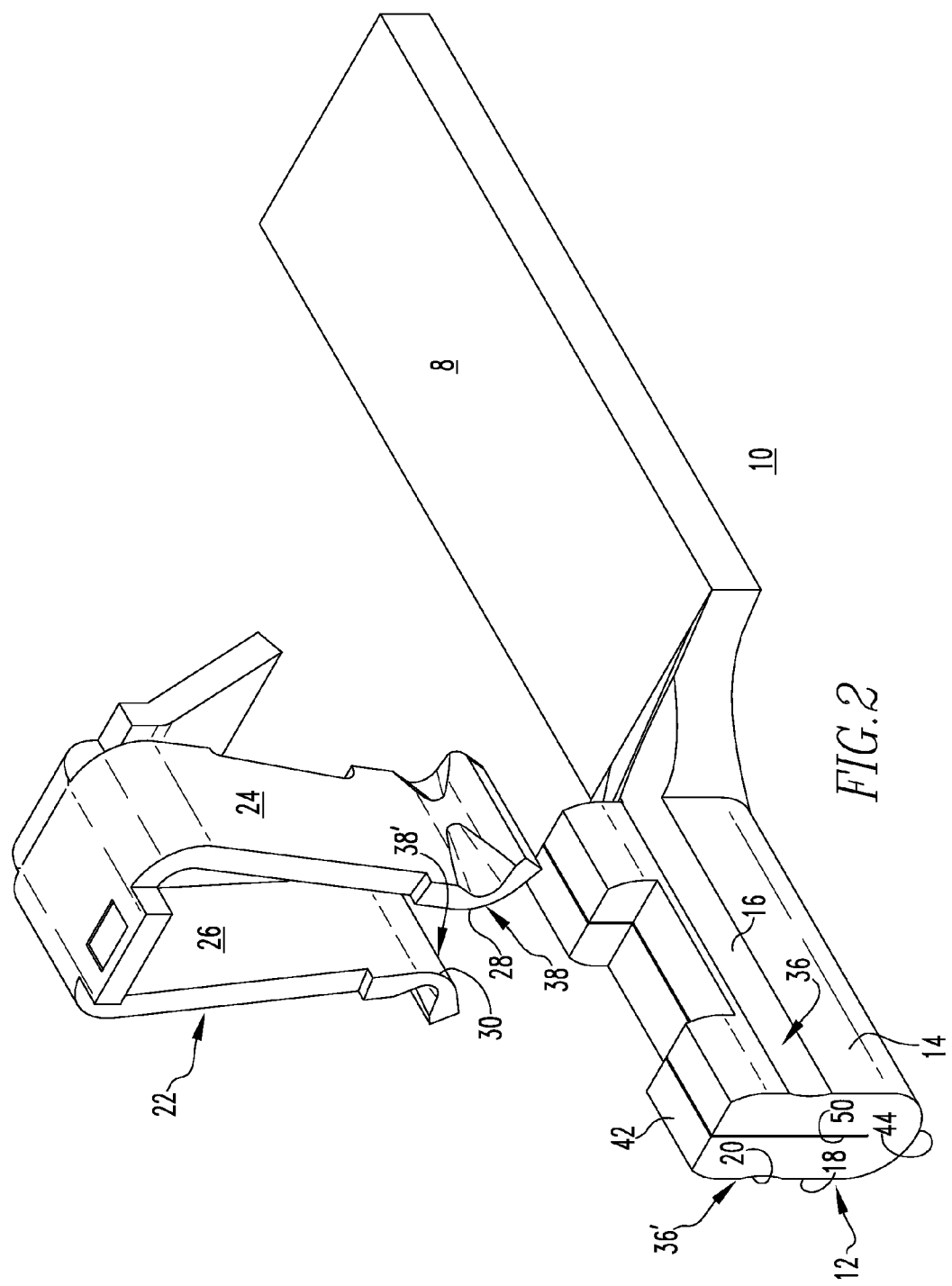
FIG. 2 is an exploded isometric view of the electrical connector assembly of FIG. 1.
Figure 3:
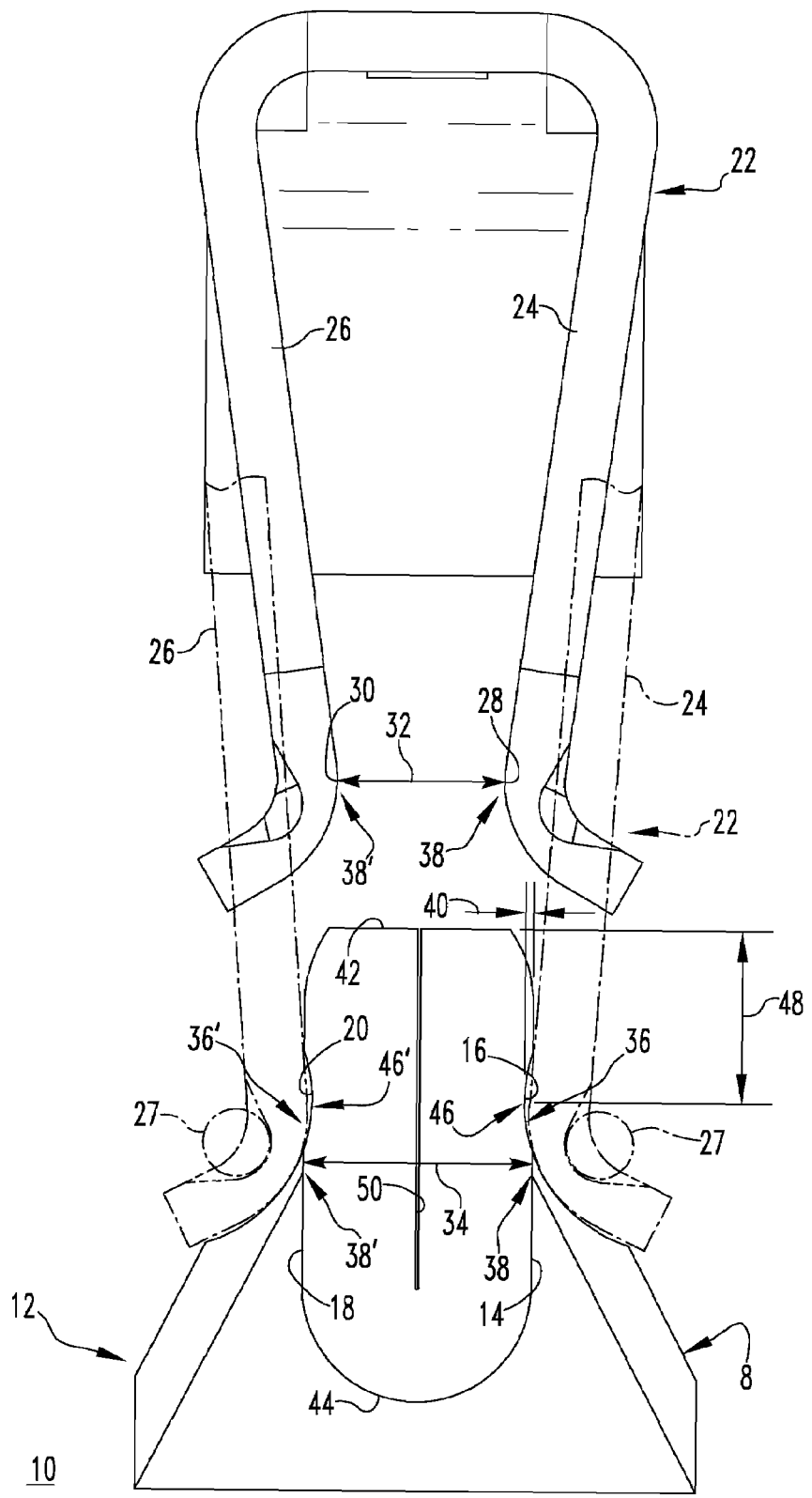
FIG. 3 is an exploded end elevation view of the electrical connector assembly of FIG. 2, also showing the electrical connector assembly in the assembled position in phantom line drawing.

Continuing to refer to FIG. 1, and also to FIGS. 2 and 3, the electrical connector assembly 10 includes a contact stab 12, which extends outwardly from the electrical bus member 8 (best shown in FIG. 1; partially shown in FIGS. 2 and 3), and a clip member 22, which is structured to mechanically couple and electrically connect the circuit breaker 6 (FIG. 1) to the contact stab 12. More specifically, the contact stab 12 includes a first side 14 having a first indentation 16 and a second side 18 having a second indentation 20, which is disposed opposite the first indentation 16 of the first side 14, as best shown in FIG. 3. The clip member 22 includes first and second opposing legs 24 and 26 having curved contact surfaces 28 and 30 (FIGS. 2 and 3), respectively. As shown in phantom line drawing in FIG. 3, when the clip member 22 is mechanically coupled and electrically connected to the contact stab 12, the first curved contact surface 28 of first leg 24 is at least partially disposed in the first indentation 16 of the contact stab 12, and the second curved contact surface 30 of the second leg 26 is at least partially disposed in the second indentation 20 of the contact stab 12. Accordingly, it will be appreciated that the indentations 16,20 of the contact stab 12 receive corresponding portions of the first and second legs 24,26 of the clip member 22, thereby increasing the retention force capabilities of the electrical connector assembly 10. That is, by virtue of the indentations 16,20, relatively more force is required to remove the clip member 22 from the contact stab 12 than would otherwise be required absent such indentations 16,20. This advantage will be further appreciated with reference to the EXAMPLE and corresponding Tables 1 and 2 discussed hereinbelow.

The first and second legs 24 and 26 are further secured within the indentations 16 and 20, respectively, by an inward bias force of the legs 24,26 against the sides 14,18, respectively, of the contact stab 12. Specifically, when the clip member 22 is not mechanically coupled and electrically connected to the contact stab 12, as shown in FIGS. 1 and 2, and also in solid line drawing in FIG. 3, the first curved contact surface 28 of the clip member 22 is spaced apart from the second curved contact surface 30 a first distance 32 (FIG. 3), and the opposing first and second sides 14,18 of the contact stab 12 are spaced apart a second distance 34 (FIG. 3). The first distance 32 is less than the second distance 34 in order that, when the clip member 22 is mechanically coupled and electrically connected to the contact stab 12, as partially shown in phantom line drawing in FIG. 3, the first leg 24 of the clip member 22 is flexed outwardly (to the right from the perspective of FIG. 3) causing it to be biased inwardly (to the left from the perspective of FIG. 3) against the first side 14 of the contact stab 12, and the second leg 26 of the clip member 22 is flexed outwardly (to the left from the perspective of FIG. 3) causing it to be biased inwardly (to the right from the perspective of FIG. 3) against the second side 18 of the contact stab 12. In this manner, the positions of the legs 24,26 of the clip member 22 are maintained with respect to the contact stab 12 and, in particular, the corresponding sides 14,18 and indentations 16,20 thereof.

The structure of the clip member legs 24,26 and the contact stab 12 will now be described in greater detail. Specifically, the contact stab first and second indentations 16,20 have a first radius of curvature 36,36', respectively, and the first and second curved contact surfaces 28,30 of the first and second legs 24,26 have a second radius of curvature 38,38', respectively. In the example shown and described herein, the first radius of curvature 36,36' is substantially the same as the second radius of curvature 38,38'. This enables the legs 24,26 and, in particular, the curved contact surfaces 28,30, respectively, to be at least partially disposed in and, therefore, retained within the corresponding indentations 16,20 (shown in phantom line drawing in FIG. 3), as previously discussed. In one non-limiting embodiment, the first radius of curvature 36,36' of each of the indentations 16,20 is about 0.125 inch. Each of the indentations 16,20 also has a depth 40, which in one non-limiting embodiment of the invention, is at least 0.002 inch.

Continuing to refer to FIG. 3, the contact stab 12 also includes first and second opposing edges 42,44, and each of the indentations 16,20 has a center point 46,46'. The center point 46,46' is located a predetermined distance 48 from the first edge 42, which in one non-limiting embodiment of the invention is about 0.139 inch to about 0.149 inch. Accordingly, the indentations 16,20 function to retain the legs 24,26, respectively, of the clip member 22 by providing a region of the contact stab 12 that is narrower than the distance 34 between the opposing sides 14,18 thereof. Consequently, it is more difficult to remove the clip member 22 and the electrical apparatus (see, for example and without limitation, circuit breaker 6 of FIG. 1) that employs the clip member 22, from the contact stab 12 than it would be to remove such a clip member (e.g., 22) from a contact stab (not shown) that is devoid of any indentations (e.g., 16,20).

The improved retention force of the disclosed electrical connector assembly 10 will be further appreciated with reference to following EXAMPLE, which is provided for illustrative purposes only and is not limiting upon the scope of the invention.

EXAMPLE

Tables 1 and 2 hereinbelow tabulate the retention force, in pounds, for an electrical connector assembly (not shown) having a contact stab without any indentations compared to the electrical connector assembly 10 of the invention in which the contact stab 12 includes indentations 16,20. Specifically, the amount of force, in pounds, which is required to remove the circuit breaker (see, for example, circuit breaker 6 of FIG. 1) from the corresponding contact stab 12 of the electrical bus member 8 was measured and recorded. Five new circuit breakers (see, for example, circuit breaker 6 of FIG. 1) were used for the test, and each circuit breaker was tested five times resulting in five retention force measurements being documented. Both the contact stab 12 and clip member contact surfaces (see, for example, curved contact surfaces 28,30 of legs 24,26, respectively, of clip member 22 of FIG. 3) were substantially smooth (i.e., substantially devoid of additional retention mechanisms such as friction enhancement features (e.g., without limitation, knurling; roughened surfaces)).

TABLE 1

Contact Stab without Indentation

Retention Force (lbs.)

| | Circuit Breaker 1 | Circuit Breaker 2 | Circuit Breaker 3 | Circuit Breaker 4 | Circuit Breaker 5 |
|---|---|---|---|---|---|
| Test 1 | 3.50 | 3.25 | 3.75 | 3.00 | 3.75 |
| Test 2 | 4.25 | 4.00 | 3.00 | 3.50 | 3.75 |
| Test 3 | 3.50 | 3.50 | 3.00 | 4.00 | 4.00 |
| Test 4 | 3.50 | 4.25 | 3.50 | 3.25 | 3.25 |
| Test 5 | 3.75 | 3.25 | 3.75 | 3.75 | 3.50 |

As shown in Table 1 hereinabove, the average retention force for an electrical connector assembly having a contact stab that is devoid of indentations was about 3.65 pounds.

TABLE 2

Contact Stab with Indentations

Retention Force (lbs.)

| | Circuit Breaker 1 | Circuit Breaker 2 | Circuit Breaker 3 | Circuit Breaker 4 | Circuit Breaker 5 |
|---|---|---|---|---|---|
| Test 1 | 5.50 | 6.50 | 5.50 | 6.00 | 6.00 |
| Test 2 | 5.75 | 6.00 | 6.00 | 6.50 | 6.50 |
| Test 3 | 5.50 | 6.50 | 5.75 | 5.50 | 5.50 |
| Test 4 | 6.00 | 5.75 | 5.50 | 5.75 | 6.00 |
| Test 5 | 5.50 | 4.75 | 5.50 | 5.25 | 5.25 |

As shown in Table 2 herein above, the average retention force for the electrical connector assembly 10 of the invention, in which the contact stab 12 includes indentations 16,20 (FIGS. 2 and 3), was about 5.85 pounds. Accordingly, it will be appreciated that the disclosed electrical connector assembly 10 substantially improves the retention force. Specifically, in the foregoing non-limiting EXAMPLE, the retention force is increased by about 62 percent.

It will be appreciated that the foregoing EXAMPLE represents the improved retention force afforded by one non-limiting embodiment in accordance with the invention. The retention force could be even further enhanced by changing various aspects of the electrical connector assembly 10. For example and without limitation, one or both of the contact stab 12 and clip member legs 24,26 could be knurled (not shown) or otherwise modified to include a friction-enhancing mechanism or structure (e.g., without limitation, surface roughening, such as relatively small bumps or protrusions). Additionally, the structure of the contact stab 12 and, in particular, the indentations 16,20 thereof could be modified without departing from the scope of the invention. For example and without limitation, the depth 40 (FIG. 3) of the indentations 16,20 could be increased. Furthermore, a clamp element 27 (FIG. 1; partially shown in phantom line drawing in FIG. 3) could also be employed in combination with the clamp member 22 to further retain the legs 24,26 of the clamp member 22 with respect to the contact stab 12. In the example shown and described herein, the clamp element 27 is generally horseshoe-shaped and is structured to be slid over the outer surfaces of the clip member legs 24,26. The example contact stab 12 also includes an elongated slot 50, which extends from the first edge 42 of the contact stab 12 toward the second edge 44 of the contact stab 12 between the first and second sides 14,18 thereof. The primary function of the elongated slot 50, which is preferred but is not required, is to accommodate thermal expansion resulting from heat generated by electrical current flowing through the contact stab 12.

It will also be appreciated that although one electrical connector assembly 10 has been shown and described herein, a plurality of such assemblies, one for securing each electrical apparatus (see, for example, circuit breaker 6 of FIG. 1) to a corresponding contact stab 12 of the electrical bus member 8, within the power distribution system 2 (FIG. 1), could be employed.

Accordingly, the disclosed electrical contact assembly 10 enhances the retention force for securing electrical apparatus (e.g., without limitation, circuit breaker 6 of FIG. 1) to the electrical bus member 8 and, in particular, the contact stab 12 thereof. Thus, disadvantages such as, for example and without limitation, the electrical apparatus 6 (FIG. 1) being unintentionally disconnected from the load center 4 (FIG. 1), are resisted.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electrical connector assembly for electrically connecting an electrical apparatus to an electrical bus member, said electrical connector assembly comprising:
   a contact stab structured to extend outwardly from said electrical bus member, said contact stab comprising a first side including a first indentation and a second side including a second indentation, the second indentation being disposed opposite the first indentation; and
   a clip member structured to mechanically couple and electrically connect said electrical apparatus to said contact stab, said clip member including a first leg and a second leg disposed opposite and distal from the first leg,
   wherein the first leg of said clip member engages the first indentation of the first side of said contact stab and the second leg of said clip member engages the second indentation of the second side of said contact stab, thereby retaining said clip member on said contact stab.

2. The electrical connector assembly of claim 1 wherein the first leg of said clip member has a first curved contact surface; wherein the second leg of said clip member has a second curved contact surface; and wherein, when said clip member is mechanically coupled and electrically connected to said contact stab, the first curved contact surface is disposed in the first indentation of said contact stab and the second curved contact surface is disposed in the second indentation of said contact stab.

3. The electrical connector assembly of claim 2 wherein, when said clip member is not mechanically coupled and electrically connected to said contact stab, the first curved contact surface of said clip member is spaced apart from the second curved contact surface of said clip member a first distance; wherein the first side of said contact stab is spaced apart from the second side of said contact stab a second distance; and wherein the first distance is less than the second distance in order that, when said clip member is mechanically coupled and electrically connected to said contact stab, the first leg of said clip member is biased against the first side of said contact stab and the second leg of said clip member is biased against the second side of said contact stab.

4. The electrical connector assembly of claim 2 wherein each of the first indentation of said contact stab and the second indentation of said contact stab has a first radius of curvature; and wherein each of the first curved contact surface of the first leg of said clip member and the second curved contact surface of the second leg of said clip member has a second radius of curvature.

5. The electrical connector assembly of claim 4 wherein the first radius of curvature is substantially the same as the second radius of curvature.

6. The electrical connector assembly of claim 4 wherein the first radius of curvature is about 0.125 inch.

7. The electrical connector assembly of claim 1 wherein each of the first indentation of said contact stab and the second indentation of said contact stab has a depth; and wherein the depth is at least 0.002 inch.

8. The electrical connector assembly of claim 1 wherein said contact stab further comprises a first edge and a second edge disposed opposite and distal from the first edge; wherein each of the first indentation of said contact stab and the second indentation of said contact stab has a center point; and wherein said center point is located a predetermined distance from the first edge.

9. The electrical connector assembly of claim 8 wherein said predetermined distance is about 0.139 inch to about 0.149 inch.

10. The electrical connector assembly of claim 8 wherein said contact stab further comprises an elongated slot; and wherein said elongated slot extends from the first edge of said contact stab toward the second edge of said contact stab between the first side of said contact stab and the second side of said contact stab.

11. A power distribution system comprising:
    an electrical bus member including a number of contact stabs each comprising a first side including a first indentation and a second side including a second indentation, the second indentation being disposed opposite the first indentation;
    at least one electrical apparatus; and
    at least one electrical connector assembly comprising:
       a clip member mechanically coupling and electrically connecting a corresponding one of said at least one electrical apparatus to a corresponding one of said number of contact stabs of said electrical bus member, said clip member including a first leg and a second leg disposed opposite and distal from the first leg,
       wherein the first leg of said clip member engages the first indentation of the first side of said corresponding one of said number of contact stabs and the second leg of said clip member engages the second indentation of the second side of said corresponding one of said number of contact stabs, thereby retaining said clip member on said corresponding one of said number of contact stabs.

12. The power distribution system of claim 11 wherein the first leg of said clip member has a first curved contact surface; wherein the second leg of said clip member has a second curved contact surface; and wherein, when said clip member is mechanically coupled and electrically connected to said contact stab, the first curved contact surface is disposed in the first indentation of said corresponding one of said number of contact stabs and the second curved contact surface is disposed in the second indentation of said corresponding one of said number of contact stabs.

13. The power distribution system of claim 12 wherein, when said clip member is not mechanically coupled and electrically connected to said corresponding one of said number of contact stabs, the first curved contact surface of said clip member is spaced apart from the second curved contact surface of said clip member a first distance; wherein the first side of said corresponding one of said number of contact stabs is spaced apart from the second side of said corresponding one of said number of contact stabs a second distance; and wherein the first distance is less than the second distance in order that, when said clip member is mechanically coupled and electrically connected to said corresponding one of said number of contact stabs, the first leg of said clip member is biased against the first side and the second leg of said clip member is biased against the second side.

14. The power distribution system of claim 12 wherein each of the first indentation of said corresponding one of said number of contact stabs and the second indentation of said corresponding one of said number of contact stabs has a first radius of curvature; and wherein each of the first curved contact surface of the first leg of said clip member and the second curved contact surface of the second leg of said clip member has a second radius of curvature.

15. The power distribution system of claim 14 wherein the first radius of curvature is about 0.125 inch.

16. The power distribution system of claim 11 wherein each of the first indentation of said corresponding one of said number of contact stabs and the second indentation of said corresponding one of said number of contact stabs has a depth; and wherein the depth is at least 0.002 inch.

17. The power distribution system of claim 11 wherein said corresponding one of said number of contact stabs further comprises a first edge and a second edge disposed opposite and distal from the first edge; wherein each of first indentation of said corresponding one of said number of contact stabs and the second indentation of said corresponding one of said number of contact stabs has a center point; and wherein said center point is located a predetermined distance from the first edge.

18. The power distribution system of claim 17 wherein said predetermined distance is about 0.139 inch to about 0.149 inch.

19. The power distribution system of claim 11 wherein said at least one electrical connector assembly further comprises a clamp element; and wherein, when said clip member is mechanically coupled and electrically connected to said corresponding one of said number of contact stabs, said clamp element extends around the first leg of said clip member and the second leg of said clip member, in order to clamp said clip member to said corresponding one of said number of contact stabs.

20. The power distribution system of claim 11 wherein said power distribution system is a load center; wherein said at least one electrical apparatus is at least one electrical switching apparatus; and wherein said at least one electrical connector assembly mechanically couples and electrically connects said at least one electrical switching apparatus to said corresponding one of said number of contact stabs of said electrical bus member.

* * * * *